United States Patent [19]  [11] 4,185,045
Yoshihara et al.  [45] Jan. 22, 1980

[54] POWDERY COATING COMPOSITION

[75] Inventors: Ichiro Yoshihara; Tadashi Watanabe; Osamu Iwase, all of Hiratsuka, Japan

[73] Assignee: Kansai Paint Company, Limited, Amagasaki, Japan

[21] Appl. No.: 880,797

[22] Filed: Feb. 24, 1978

[30] Foreign Application Priority Data

Feb. 26, 1977 [JP] Japan ............................... 52/20458

[51] Int. Cl.$^2$ .................. C08L 25/08; C08L 61/26; C08L 61/28; C08L 67/00
[52] U.S. Cl. ........................... 525/181; 525/58; 525/157; 525/163
[58] Field of Search ............... 260/856, 855, 850, 851

[56] References Cited

U.S. PATENT DOCUMENTS

| | | | |
|---|---|---|---|
| 3,790,513 | 2/1974 | Victorius | 260/856 |
| 3,846,368 | 11/1974 | Pettit, Jr. | 260/856 |
| 3,887,637 | 6/1975 | Waitkus | 260/856 |
| 3,887,642 | 6/1975 | van der Missen | 260/856 |
| 3,919,350 | 11/1975 | Iwasawa et al. | 260/850 |
| 3,919,352 | 11/1975 | Iwasawa et al. | 260/856 |
| 4,027,066 | 5/1977 | Victorius | 260/856 |

FOREIGN PATENT DOCUMENTS

| | | | |
|---|---|---|---|
| 211109 | of 1907 | Australia | 260/856 |
| 51-48166 | 12/1976 | Japan . | |
| 51-48176 | 12/1976 | Japan . | |
| 875949 | 8/1961 | United Kingdom | 260/856 |
| 1105561 | 3/1968 | United Kingdom | 260/856 |

*Primary Examiner*—Allan Lieberman
*Attorney, Agent, or Firm*—Larson, Taylor and Hinds

[57] ABSTRACT

A powdery coating composition comprising (1) 10 to 40% by weight of a solid cross-linking agent having a softening point of 50° to 120° C. and prepared by heating 40 to 75% by weight of an acrylic resin having free hydroxyl groups and 60 to 25% by weight of an alkoxyaminotriazine at 50° to 120° C., and (2) 90 to 60% by weight of a base resin having a softening point of 60° to 130° C. and an acid value of up to 30 and containing 0.4 to 2.0 moles of free hydroxyl groups per kilogram of the resin, the alkoxyaminotriazine having 0 to 1 non-methylolated NH bond per triazine ring, at least 80% of the methylol groups of the alkoxyaminotriazine having been etherified with an aliphatic or alicyclic alcohol or ethylene glycol monoalkyl ether.

12 Claims, No Drawings

POWDERY COATING COMPOSITION

This invention relates to powdery coating compositions, and more particularly to powdery coating compositions containing an aminotriazine derivative as a cross-linking agent.

With the severity of regulations to control environmental pollution in recent years, stringent conditions have been imposed on coating compositions of this type in respect of the quality, preparation and storage of the compositions as well as coating operations. Among other things, problems are encountered with such compositions in that when baked for the formation of coatings, the composition releases volatiles, emitting a mist and formalin odor.

Powdery coating compositions containing an aminotriazine as a cross-linking agent have already been developed. The known compositions give off a heavy mist and strong formalin odor during the preparation thereof, namely when a mixture of vehicle, pigment and additive are melted together to obtain a uniform dispersion, or when the composition applied to workpieces is baked in an oven to form coatings.

Japanese Pat. No. 873110 (Published Examined patent application No. 48167/1976) discloses powdery coating compositions composed of an alkoxyaminotriazine and an acrylic resin. More specifically the disclosed coating compositions consist essentially of (1) 4 to 20% by weight of an etherified methylolmelamine mixture containing

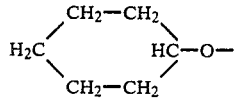

groups and methoxy groups in the combined number of 5.5 to 6.0 per triazine ring on the average, the number of the former groups being 0.5 to 3.0 per triazine ring on the average, and (2) 96 to 80% by weight of an acrylic resin having a softening point of 65° to 130° C. and an acid value of 5 to 20 and containing 0.4 to 2.0 moles of free hydroxyl groups per kilogram of the resin. Japanese Pat. No. 873109 (Published examined patent application No. 48166/1975) also discloses powdery coating compositions composed of an alkoxyaminotriazine and an acrylic resin. More specifically stated, the disclosed coating compositions consist essentially of (1) 4 to 20% by weight of an etherified methylolmelamine mixture containing $ROCH_2CH_2O-$ groups (R: alkyl group having 1 to 4 carbon atoms) and $CH_3O-$ groups in the combined number of 5.5 to 6.0 per triazine ring on the average, the number of the former groups being 0.5 to 3.0 per triazine ring on the average, and (2) 96 to 80% by weight of an acrylic resin having a softening point of 65° to 130° C. and an acid value of 5 to 20 and containing 0.4 to 2.0 moles of free hydroxyl groups per kilogram of the resin. These two compositions have an improved property against bubbling (the phenomenon in which the gas produced during the baking of the composition vaporizes off through the coating of increased viscosity, leaving holes or small craters in the coating) and have been greatly improved over the above-mentioned aminotriazine-containing compositions in that they entail substantially reduced emission of mist and formalin odor, which however, may still pose problems in factories located for example in urban areas.

Powdery coating compositions are known which contain a vehicle component prepared by partially reacting with heating a mixture of a hydroxyl-containing resin and an alkoxyamino compound in the weight ratio ranging from 97:3 to 80:20 until a reaction efficiency reaches about 10%. However, due to the large proportion of the hydroxyl-containing resin, a partial cross linking is likely to occur between the resin and the alkoxyamino compound. Thus difficulty is encountered in forming a smooth coating layer by direct application of the powdery coating composition comprising such reaction product.

The main object of this invention is to provide powdery coating compositions which will not give off a mist or formalin odor detrimental to the environment.

Another object of this invention is to provide powdery coating compositions which will not pose any environmental pollution problem even in factories located in urban areas.

Still another object of this invention is to provide powdery coating compositions having an outstanding property against bubbling and therefore comparable to the known compositions composed of an acrylic resin and an alkoxyaminotriazine in this property.

These and other objects of this invention will become apparent from the following description.

The foregoing objects of this invention can be fulfilled by using a solid cross-linking agent having a softening point of 50° to 120° C. and prepared by heating 40 to 75% by weight of an acrylic resin having free hydroxyl groups and 60 to 25% by weight of the alkoxyaminotriazine specified below at 50° to 120° C. Stated more specifically, this invention provides powdery coating compositions comprising: (1) 10 to 40% by weight of a solid cross-linking agent having a softening point of 50° to 120° C. and prepared by heating 40 to 75% by weight of an acrylic resin having free hydroxyl groups and 60 to 25% by weight of an alkoxyaminotriazine at 50° to 120° C., and (2) 90 to 60 by weight of a base resin having softening point of 60° to 130° C. and an acid value of up to 30 and containing 0.4 to 2.0 moles of free hydroxyl groups per kilogram of the resin, the alkoxyaminotriazine having 0 to 1 non-methylolated NH bond per triazine ring, at least 80% of the methylol groups of the alkoxyaminotriazine having been etherified with an aliphatic or alicyclic alcohol or ethylene glycol monoalkyl ether.

The use of the above-specified cross-linking agent in the compositins of this invention greatly inhibits or prevents the emission of mist and formalin odor during the preparation of the compositions as well as the baking of the compositions applied to workpieces, further producing outstanding effects in preventing bubbling and giving improved curability at low temperatures (up to 170° C.) and an improved anti-blocking property. These effects are achieved solely by the use of the cross-linking agent prepared from an acrylic resin having free hydroxyl groups and the specified alkoxyaminotriazine in the specified ratio of 40-75% by weight of the former to 60-25% by weight of the latter by heating the two ingredients at 50° to 120° C. Even if the acrylic resin and the above-specified alkoxyaminotriazine are heated at 50° to 120° C., the resulting product would fail to give the foregoing effects when the two ingredients are used in ratios outside the above-mentioned range. With this invention, since the proportions of the acrylic resin and alkoxyaminotriazine contained in the cross-linking agent are within the foregoing specific range, alkylalkoxy groups of the alkoxyaminotriazine partly participate in the reaction between the acrylic resin and the alkoxyaminotriazine, and the reaction product has a structure in which to the acrylic resin is added about 1 mole of alkoxyaminotriazine per mole of the hydroxyl group contained in the acrylic resin. Therefore, it is presumed that no gelation reaction takes place during the progress of the reaction for production of the cross-linking agent.

Cross-linking agents useful in this invention are those prepared by heating an acrylic resin having free hydroxyl groups and the alkoxyaminotriazine specified above.

Acrylic resins useful for the preparation of the cross-linking agents are those having a free hydroxyl group and prepared by polymerizing in the usual manner at least one of monomers having a hydroxyl group and monomers having no functional group (OH group or COOH group), along with at least one of monomers having a carboxyl group when so desired. Preferable examples are those prepared by solution polymerization in the presence of a solvent and a radical polymerization initiator. Examples of monomers having a hydroxyl group are hydroxyalkyl acrylates and hydroxyalkyl methacrylates, among which preferable are 2-hydroxyethyl acrylate, 2-hydroxypropyl acrylate, 2-hydroxyethyl methacrylate, 2-hydroxypropyl methacrylate, etc. Examples of monomers having no functional group are polymerizable vinyl monomers having no OH or COOH group. Preferable examples are styrene, vinyltoluene, α-methylstyrene, vinyl acetate and alkyl (having 1 to 12 carbon atoms) esters of acrylic acid or methacrylic acid. Examples of monomers having a carboxyl group are polymerizable monomers having at least one carboxyl group. Preferable examples are acrylic acid, methacrylic acid, crotonic acid, itaconic acid, maleic acid, etc. Radical polymerization initiators useful for the polymerization are those soluble in solvents or oils and generally used. Specific examples of such initiators are benzoyl peroxide, lauroyl peroxide, azobsisobutyronitrile, azobisisovaleronitrile, etc. When it is desired to adjust the softening point of the resin by varying the molecular weight thereof, lauroylmercaptan, t-dodecylmercaptan or like chain transfer agent can be used in an amount of up to 5% by weight based on the combined amount of the monomers used. Examples of useful solvents for the polymerization are toluene, xylene, ethyl acetate, n-butyl acetate, methyl ethyl ketone, methyl isobutyl ketone, n-butanol, isobutanol, propanol, isopropanol, etc. The polymerization is conducted effectively under the usual condition. For example, monomers and radical polymerization initiators are added dropwise into solvents at a temperature of 50° to 150° C. and at monomer concentration of 30 to 70% by weight over a period of 1 to 5 hours, and then to the resulting solution a catalyst is added. The resulting mixture is maintained at the same temperature for 1 to 5 hours to complete the polymerization and the solvent is removed from the polymerized mixture under a reduced pressure.

Alkoxyaminotriazines useful in this invention for the preparation of the cross-linking agents, typical of which is hexakismethoxymethylmelamine, are those having 0 to 1 non-methylolated NH bond per triazine ring, with at least 80% of the methylol groups thereof etherified with an aliphatic or alicyclic alcohol or ethylene glycol monoalkyl ($C_{1-4}$ alkyl) ether. Representative examples of aminotriazines are malamine, benzoguanamine, acetoguanamine, formoguanamine, spiroguanamine, etc. Examples of useful aliphatic or alicyclic alcohols are those usually having 1 to 12 carbon atoms, such as methanol, ethanol, propanol, isopropanol, n-butanol, isobutanol, sec-butanol, n-amyl alcohol, isoamyl alcohol, neopentanol, n-hexanol, cyclohexanol, n-heptanol, n-octyl alcohol, 2-ethylhexanol, etc. Useful ethylene glycol monoalkyl ethers are those in which the alkyl has 1 to 4 carbon atoms, such as ethylene glycol monomethyl ether, ethylene glycol monoethyl ether, ethylene glycol monobutyl ether, etc. The alkoxyaminotriazine can be etherified with such an aliphatic or alicyclic alcohol or ethylene glycol monoalkyl ether effectively under the usual etherifying conditions. For example, a mixture of the alkoxyaminotriazine and said alcohol or glycol ether is heated at a temperature of 30° to 120° C., and a reduced pressure of 40 to 100 mmHg for 1 to 20 hours to complete the etherifying reaction, then the resulting mixture is neutralized to a pH of 7 to 8 with a sodium hydroxide solution. The neutralized mixture is concentrated substantially to 100% by removing unreacted alcohol or glycol ether at a temperature of 130° to 160° C., and a reduced pressure of 10 mmHg or lower. The concentrate is filtered to remove the salt formed on neutralization.

The cross-linking agents of this invention are prepared from the acrylic resin and the alkoxyaminotriazine in the ratio of 40–75% by weight, preferably 50–70% by weight, of the former to 60–25% by weight, preferably 50–30% by weight, of the latter by heating the two components at 50° to 120° C., preferably at 60° to 110° C., for 1 to 6 hours. With less than 25% by weight of alkoxyaminotriazine present, the mixture of the two components tends to wholly or partially gel during heating, with the objectionable result that the gelation, even if occurring partially, gives a seeding (rough surface caused by containing coarse particles) or very poor smoothness to the coating formed. Conversely if more than 60% by weight of the alkoxyaminotriazine is used, the resulting cross-linking agent will not be in the form of a solid, presenting difficulties in the preparation of coating compositions and affording a reduced anti-blocking property to the powdery coating compositions obtained. For the reaction of the two components, a solution of the acrylic resin, which is preferably one resulting from solution polymerization, and the alkoxyaminotriazine are mixed together in predetermined amounts and are reacted in the presence of a small amount, usually 0 to 1.0% by weight or preferably 0 to 0.1% by weight, of an acid at 50° to 120° C., preferably at 60° to 110° C., for 1 to 6 hours, preferably for 1.5 to 5 hours. Examples of useful solvents for this reaction are toluene, methyl acetate, ethyl acetate, n-butyl acetate, acetone, methyl ethyl ketone, methyl isobutyl ketone, dioxane, tetrahydrofuran, etc., among which toluene, ethyl acetate, methyl ethyl ketone and methyl isobutyl ketone are preferable. Examples of useful acids are p-toluene sulfonic acid, monochloro acetic acid, dichloro acetic acid, trichloro acetic acid, citric acid, orthophosphoric acid, nitric acid, etc. Such an acid, when used, will promote the reaction. The solvent is distilled off from the reaction mixture at reduced pressure, and the residue is run off from the reactor at a temperature of not higher than 150° C. and then cooled, whereby a solid cross-linking agent can be obtained.

The cross-linking agents of this invention can be reacted further with an acid amide. Examples of useful acid amides are amides of toluenesulfonic acid, benzenesulfonic acid, xylenesulfonic acid, and like aromatic sulfonic acids; amides of toluenecarboxylic acid, benzoic acid, xylenecarboxylic acid and like aromatic carboxylic acids; amides of cyclohexyl sulfonic acid, cyclohexyl-1-methyl-4-sulfonic acid and like alicyclic sulfonic acids; and amides of cyclohexyl carboxylic acid, cyclohexyl-1-methyl-4-carboxylic acid and like alicyclic carboxylic acids. Preferable among these examples are p-toluenesulfonic acid amide, p-toluenecarboxylic acid amide, benzenesulfonic acid amide and cyclohexyl sulfonic acid amide. Such an acid amide is used in an amount of up to 30% by weight, preferably 2 to 20% by weight, based on the weight of the acrylic resin and the alkoxyaminotriazine. The use of the acid amide gives the crosslinking agent a higher softening point and consequently imparts an improved anti-blocking property to the powdery coating compositions prepared without producing any adverse effect on the properties of the coatings to be formed. The acid amide, if used in excess of 30% by weight, tends to produce a scorched color to the coatings on baking. The acid amide may be reacted with the cross-linking agent simultaneously with the reaction between the acrylic resin and the alkoxyaminotriazine, but it is preferable to effect the reaction of the acrylic resin and alkoxyaminotriazine first, add the acid amide to the reaction mixture and heating the resulting mixture at 50° to 120° C. for a further 1 to 5 hours together with a small amount, usually about 0 to about 1.0% by weight, of an amine. The amine acts to retard the reaction. Examples of useful amines are dimethyl amino ethanol, diethanolamine, triethanolamine and the like.

Basic resins useful in this invention are acrylic resins and/or polyester resins. Acrylic resins useful as basic resins are the hydroxyl functional acrylic copolymers having specified softening point and acid value, while the same acrylic resins as used for the preparation of the cross-linking agents of this invention may also be successfully used as basic resins. Polyester resins useful in this invention are any of those containing 0.4 to 2.0 moles of free hydroxyl groups per kilogram of the resin and having a softening point of 60° to 130° C. and an acid value of up to 30 and are not particularly limited in the method of preparation thereof. Examples of carboxylic acids useful for the preparation of such polyester resins are 1,2,4-benzenetricarboxylic acid, phthalic acid, tetrahydrophthalic acid and hexahydrophthalic acid; anhydrides or mono- or tri-alkyl esters of such acids; isophthalic acids, terephthalic acid, azelaic acid, adipic acid and sebacic acid; mono- or di-alkyl esters of such acids; and benzoic acid, p-tert-butylbenzoic acid, etc. Among these examples, preferable are dimethyl ester of terephthalic acid, isophthalic acid, trimellitic acid anhydride, hexahydrophthalic anhydride, adipic acid, sebacic acid and p-tert-butylbenzoic acid. Examples of dihydric alcohols useful for the polyester resins are ethylene glycol, diethylene glycol, propylene glycol, trimethylene glycol, 1,3-, 1,2- and 1,4-butanediols, hexanediol, neopentyl glycol, 1,4-cyclohexanedimethanol, etc., among which preferable are ethylene glycol, 1,3-butanediol and neopentyl glycol. Typical of useful trihydric or polyhydric alcohols are glycerine, trimethylolpropane, trimethylolethane, trishydroxyethyl isocyanurate, pentaerythritol, etc. Materials other than these examples are usable according to this invention insofar as they can be polyesterified in a suitable combination to resins having the specified softening point and acid value and containing the specified amount of hydroxyl groups as mentioned above.

It is critical that the base resins useful in this invention have a softening point of 60° to 130° C. as determined according to JIS-K-2531 (ring-and-ball method). Base resins having a softening point of lower than 60° C. are not desirable since the resin particles tend to cohere to each other, whereas those having a softening point of over 130° C. involve the likelihood of giving coatings of reduced smoothness when made into thin coatings (about 60 to about 70μ in thickness). The base resins should further have an acid value of not higher than 30, preferably 0 to 20. If the acid value is higher than 30, the particles of the coating composition obtained will melt and start to undergo curing reaction before forming a coating, reducing the flowability of the composition applied to the workpiece and failing to give a glossy and smooth-surfaced coating. Moreover increased bubbling will result. Thus the composition will not be useful. According to this invention, it is also required that the base resins contain 0.4 to 2.0 moles of free hydroxyl groups per kilogram of the resin. When containing less than 0.4 mole of hydroxyl groups per kilogram of the resin, the resin will have an insufficient number of cross-linkable functional groups, giving reduced curability to the coating prepared therefrom, whereas with more than 2.0 moles of hydroxyl groups present per kilogram of the resin, too great a curing velocity will result, affording coatings of reduced gloss and reduced smoothness and greater susceptibility to bubbling.

The powdery coating compositions of this invention consist essentially of 10 to 40% by weight, preferably 20 to 40% by weight, of the cross-linking agent of the invention and 90 to 60% by weight, preferably 80 to 60% by weight, of the base resin. If the amount of the cross-linking agent is less than 10% by weight, the composition will have decreased curability at low temperatures (at about 170° C.), whereas if it is more than 40% by weight, reduced anti-blocking properties will result. According to this invention, the base resin can be the same as the acrylic resin component of the cross-linking agent.

The powdery coating compositions of this invention can be formulated by any of the known methods of preparing powdery coating compositions, for example, by mixing the cross-linking agent and basic resin, along with a pigment and other additives when so desired, usually at about 80 to about 150° C. with use of two or three rolls or an extruder of the heating type and comminuting the mixture. It is also possible to mix the base resin and a pigment with heating along with other additives desired, comminute the mixture and admixing the cross-linking agent with the mixture with heating. This method is advantageous in avoiding an excessive thermal effect, assuring the desirable features of the present composition with improved results. Pigments useful in this invention are various and include coloring pigments such as titanium dioxide, lithopone, zinc white, organic red lake pigment, red iron oxide, organic yellow pigment, phthalocyanine blue, carbon black, aluminum powder paste, etc., and extender pigments such as calcium carbonate, clay, talc, mica, etc. Examples of other additives are surface smoothening agents, cissing preventing agents, pigment dispersing agent and the like.

The powdery coating compositions of this invention are applicable by any coating method usable for known powdery coating compositions, for example, by an electrostatic powder spray method, a fluidized bed coating method, etc.

This invention will be described below in greater detail with reference to Reference Examples for the preparation of cross-linking agents and base resins and Examples for the preparation of compositions of the invention, in which the parts and percentages are all by weight.

REFERENCE EXAMPLE 1

Preparation of Cross-Linking Agent a

Into one-liter three-necked flask equipped with a thermometer, stirrer and means for removing methanol produced as a by-product from the system are placed 390 parts of hexakismethoxymethylmelamine, 170 parts of cyclohexanol and 1 parts of 60% nitric acid. The mixture is gradually heated with the system maintained at reduced pressure of 50 to 60 mm Hg while the methanol resulting from the reaction is being removed from the system. The reaction is conducted at 50° C. for 3 hours.

After the completion of the reaction, the mixture is neutralized to a pH of 7.0 to 8.0 with a 30% methanol solution of sodium hydroxide. The neutralized mixture is concentrated substantially to 100% at a temperature of 140° to 150° C. in a vacuum of 5 mm Hg by removing the unreacted cyclohexanol. The concentrate is filtered to remove the salt formed on neutralization.

The reaction product thus obtained is in the form of a transparent, consistent liquid having a viscosity of Z-2 as determined by the Gardner-Holdt bubble viscometer. An analysis on the reaction product reveals that the product is cyclohexanol-modified methoxymethylmelamine containing 1.1 cyclohexyl group per triazine ring and hardly any methylol group.

REFERENCE EXAMPLE 2

Preparation of Cross-Linking Agent b

Into a 2-liter four-necked flask equipped with a reflux condenser, stirrer, dropping funnel and thermometer is placed 370 parts of toluene, which is heated to 100° C. while nitrogen gas is being introduced into the flask. A mixture of 74 parts of 2-hydroxyethyl methacrylate, 148 parts of styrene, 148 parts of methyl methacrylate, and 15 parts of azobisisobutyronitrile placed in the dropping funnel is added dropwise to the toluene maintained at the same temperature over a period of 3 hours. A mixture of 0.2 part of azobisisovaleronitrile and 2 parts of toluene is added dropwise to the mixture at the same temperature three times at an interval of one hour. The resulting mixture is maintained at 100° C. for one hour. Subsequently, with a separator attached to the reflux condenser, 260 parts of Cross-Linking Agent a is added to the resulting mixture. The mixture is stirred for 30 minutes, and 0.05 part of p-toluenesulfonic acid is added to the mixture. The mixture is maintained at 100° C. for 2 hours while the methanol and water resulting from the reaction are being removed from the system. One part of triethanolamine is thereafter added to the reaction mixture, and the mixture is concentrated at a temperature of 80° to 130° C. in a vacuum of 5 to 30 mm Hg to remove the toluene.

The reaction product thus prepared is in the form of a pale yellow solid containing 99.0% of nonvolatile component and having softening point of 75° C.

REFERENCE EXAMPLE 3

Preparation of Cross-Linking Agent c

Following the same procedure as in Reference Example 2 and using the same device as therein, a mixture of 83 parts of 2-hydroxypropyl methacrylate, 132 parts of styrene, 100 parts of methyl methacrylate, 15 parts of ethyl acrylate and 7 parts of azobisisobutyronitrile placed in the dropping funnel is added dropwise to 330 parts of toluene in the flask over a period of 3 hours. The same procedure as in Reference Example 2 is thereafter repeated. In place of Cross-Linking Agent a, 264 parts of Cymel # 350 (trademark of American Cyanamid Co., Ltd. modified methoxymethylmelamine) and 0.05 part of p-toluenesulfonic acid are added to the resulting product, the mixture is maintained at 100° C. for one hour, and 75 parts of p-toluene-sulfonic acid amide is thereafter added to the mixture. The resulting mixture is maintained at 100° C. for a further 2 hours, one part of dimethylamino ethanol is subsequently added, and the toluene is removed in the same manner as in Reference Example 2. The reaction product is in the form of a pale yellow solid containing 98.5% of nonvolatile component and having a softening point of 85° C.

REFERENCE EXAMPLE 4

Preparation of Base Resin A

Into a 2-liter four-necked flask equipped with a reflux condenser, stirrer, dropping funnel and thermometer is placed 800 parts of toluene, which is heated to 110° C. while nitrogen gas is being introduced into the flask. A mixture of 160 parts of 2-hydroxyethyl methacrylate, 40 parts of butyl acrylate, 264 parts of methyl methacrylate, 320 parts of ethyl methacrylate, 16 parts of acrylic acid and 10 parts of benzoyl peroxide placed in the dropping funnel is added dropwise to the toluene maintained at the same temperature over a period of 2 hours. A mixture of one part of benzoyl peroxide and 10 parts of toluene, serving as an additional catalyst, is then added dropwise to the mixture at the same temperature three times at an interval of one hour. The resulting mixture is maintained at 110° C. for a further three hours. With the condenser changed over to a concurrent condenser, the temperature of the contents is gradually elevated to 140° C. while the solvent and unreacted monomers are being withdrawn from the system. When about 60% of the charged solvent has been run off, the reaction mixture is further concentrated at 160° C. in a vacuum of about 5 to about 50 mm Hg. On completion of the removal of the solvent, the residue is placed into a stainless steel vat and cooled for solidification. The acrylic resin thus prepared contains 99.2% of nonvolatile component and 1.49 moles of free hydroxyl groups per kilogram of the resin and has a softening point of 93° C. and an acid value of 15.3.

REFERENCE EXAMPLE 5

Preparation of Base Resin B

Into a reactor equipped with a stirrer, thermometer and separator are placed 194.0 parts (1.0 mole) of dimethyl terephthalate, 174.6 parts (0.9 mole) of dimethyl isophthalate, 146.0 parts (1.4 moles) of neopentyl glycol, 86.8 parts (1.4 moles) of ethylene glycol and 27.6 parts (0.3 mole) of glycerin. The mixture is melted by heating, and the melt is further heated to a temperature of 160° C. with stirring, whereupon 1.0 part of lead oleate is added to the melt. The mixture is further heated to 240° C. and maintained at this temperature for one hour while the methanol resulting from the reaction is being removed through the separator. Subsequently 43.8 parts (0.3 mole) of adipic acid and 116.2 parts (0.70 mole) of isophthalic acid are added to the reaction mixture. This lowers the temperature of the system to about 180° C. The mixture is continuously heated to 240° C., whereupon 30 parts of xylene is slowly added to the mixture. The resulting mixture is maintained at the same temperature for 2 hours while the water produced is separated from the xylene by the separator and removed.

The mixture resulting from the reaction is subjected to a vacuum to remove the xylene, then cooled and withdrawn from the reactor while the residue is still flowable.

The polyester resin prepared has a softening point of 88° C. and an acid value of 8.0 and contains 1.08 moles of free hydroxyl groups per kilogram of the resin.

EXAMPLES 1 TO 4 AND COMPARISON EXAMPLES 1 TO 3

The cross-linking agents and base resins prepared in Reference Examples are mixed together in the proportions listed in Table 1 below with addition of 15 parts of cyclohexanone-type ketone resin (trademark: "ARON XR", product of Mitsui-Toatsu Co., Ltd., Japan) serving as a surface smoothening agent and 50 parts of titanium dioxide as a pigment.

Each of the mixtures is treated in an experimental hot roll mill, 8.8 cm in roll diameter, at 100° C. for 20 minutes to prepare a uniform melt, which is then comminuted in a hammer mill to a powder. The powder is screened by a 100-mesh sieve to obtain a white powdery coating composition.

In Table 1 the specimens of Examples 1 to 4 are examples of powdery coating compositions prepared according to this invention, and the specimens of Comparison Examples 1 to 3 are those prepared to clarify the features of the invention.

Table 1

| Specimen | Base Resin Kind | Amount (wt. pt.) | Cross-Linking Agent Kind | Amount (wt. pt.) |
|---|---|---|---|---|
| Example 1 | A | 70 | b | 30 |
| 2 | A | 85 | c | 15 |
| 3 | B | 65 | b | 35 |
| 4 | B | 70 | c | 30 |
| Comp. Ex. 1 | A | 90 | Cymel #300* | 10 |
| 2 | A | 88 | a | 12 |
| 3 | Reaction product of Base Resin A and Cymel #300 in the ratio of 80:20 | | | |

*Cymel #300 is a trademark of American Cyanamid Co., Ltd. for hexakismethoxymethylmelamine.

Each of the specimens is applied to 0.8-mm-thick polished mild steel panels by the electrostatic spray method to stepwise varying thicknesses and also to such a thickness that the coating will be about 80μ thick when cured, and the coated panels are baked at 170° C. for 30 minutes for curing. The panels with coatings of varying thicknesses are tested for the maximum thickness of the coating which permits the coating to remain free of bubbling (referred to as "bubbling-free thickness" in the following table). The panels with about 80-μ-thick coatings are tested for various properties of the coating. Table 2 shows the results.

The weight loss on heating is expressed in terms of the percentage of the reduction in the weight of the powdery coating composition (about 20 mg) produced when the composition is heated at 170° C. for 30 minutes, as measured on a differential thermobalance (product of Rigaku Denki Co., Ltd., Japan).

Table 2

| Test Item | Example 1 | 2 | 3 | 4 | Comparison Example 1 | 2 | 3 |
|---|---|---|---|---|---|---|---|
| Weight loss on heating (%) | 1.1 | 1.3 | 0.8 | 1.5 | 8.3 | 6.2 | 3.5 |
| Formalin odor* | I | I | I | I | V | IV | IV |
| Formalin odor during baking | II | II | II | II | V | IV | IV |
| Mist during baking | I | II | I | II | V | IV | IV |
| Bubbling-free thickness | 180 | 180 | 180 | 180 | 70 | 160 | 110 |
| Erichsen test (mm) | >7 | >7 | >7 | >7 | 0.7 | >7 | 2.5 |
| Gloss value (60 deg specular gloss) | 95 | 93 | 90 | 90 | 63 | 95 | 57 |
| Resistance to gasoline | 2H | H | 3H | H | <6B | B | 2B |
| Anti-blocking property | II | II | II | II | V | IV | IV |

*Formalin odor given off during the preparation of the coating composition.

The properties listed in Table 2 are determined by the following test methods with the evaluations made according to the following criteria. Formalin odor and mist:

The degrees of the emission of the odor or mist are represented by I, II, III, IV and V; the smaller the number, the less is the odor or mist given off. Thus, the ratings for the result are as follows: I, excellent>II, good>III, fair>IV, poor>V bad. Erichsen test:

According to JIS-Z-2247. The greater the numerical value, the higher is the flexibility. Gloss value:

According to JIS-K-5400, 6.7. Resistance to gasoline:

The test panel is immersed in gasoline ("Nisseki Silver Gasoline", trademark of Nippon Oil Co., Ltd., Japan) at 20° C. for 24 hours, then withdrawn and immediately tested for pencil hardness at 20° C. according to JIS-K-5400, 6.14. The higher the hardness, the higher is the resistance to gasoline. Anti-blocking property of the composition:

A 15.0 g portion of the powdery composition is placed in a test tube, 40 mm in diameter, then subjected to a load of 20 g/cm$^2$ at 35° C. for 240 hours and thereafter withdrawn from the test tube to observe whether the specimen restores its original form of finely divided particles. The degrees of the restoration are expressed by I, II, III, IV and V. The smaller the number, the better; "V" indicates that the specimen completely fails to restore itself. Thus the degrees of the restoration show the following ratings: I, excellent>II, good>III, fair>IV, poor>V, bad.

What is claimed is:

1. A powdery coating composition comprising:
(1) 10 to 40% by weight of a solid cross-linking agent having a softening point of 50° to 120° C. and prepared by heating 40 to 75% by weight of an acrylic resin having free hydroxyl groups and 60 to 25% by weight of an alkoxyaminotriazine at 50° to 120° C. for 1 to 6 hours, the reaction product prepared by said heating having a structure in which to the acrylic resin is added about 1 mole of the alkoxyaminotriazine per mole of the hydroxyl group contained in the acrylic resin, and (2) 90 to 60% by weight of at least one base resin selected from the group consisting of acrylic resins and polyester resins having a softening point of 60° to 130° C. and an acid value of up to 30 and containing 0.4 to 2.0 moles of free hydroxyl groups per kilogram of the resin, the alkoxyaminotriazine having 0 to 1 non-methylolated NH bond per triazine ring, and at least 80% of the methylol groups of the alkoxyaminotriazine having been etherified with an aliphatic or alicylic alcohol or ethylene glycol monoalkyl ether having 1 to 4 carbon atoms in the alkyl group.

2. The powdery coating composition according to claim 1 in which said solid cross-linking agent is prepared by heating 50 to 70% by weight of an acrylic resin having free hydroxyl groups and 50 to 30% by weight of an alkoxyaminotriazine at 50° to 120° C.

3. The powdery coating composition according to claim 1 in which said heating is conducted at 60° to 110° C.

4. The powdery coating composition according to claim 1 in which said heating is conducted in the presence of a solvent.

5. The powdery coating composition according to claim 1 in which said acrylic resin is a reaction product prepared by reacting (a) at least one of hydroxyalkylacrylate and hydroxyalkylmethacrylate with (b) at least one of styrene, vinyltoluene, α-methylstyrene, vinyl acetate and alkyl esters of acrylic acid or methacrylic acid having 1 to 12 carbon atoms in the alkyl group.

6. The powdery coating composition according to claim 1 in which said acrylic resin is a reaction product of (a) at least one of hydroxyalkylacrylate and hydroxyalkylmethacrylate, (b) at least one of styrene, vinyltoluene, α-methylstyrene, vinyl acetate and alkyl (having 1 to 12 carbon atoms) esters of acrylic acid or methacrylic acid having 1 to 12 carbon atoms in the alkyl group and (c) at least one of acrylic acid, methacrylic acid, crotonic acid, itaconic acid and maleic acid.

7. The powdery coating composition according to claim 5 in which said reaction is conducted in the presence of a solvent.

8. The powdery coating composition according to claim 1 in which said alkoxyaminotriazine is alkoxymelamine, alkoxybenzoguanamine, alkoxyacetoguanamine, alkoxyformoguanamine or alkoxyspiroguanamine.

9. The powdery coating composition according to claim 1 in which said aliphatic or alicyclic alcohol has 1 to 12 carbon atoms.

10. The powdery coating composition according to claim 1 in which said solid cross-linking agent is prepared by 40 to 75% by weight of an acrylic resin having free hydroxyl groups, 60 to 25% by weight of an alkoxyaminotriazine and up to 30% by weight of an acid amide based on the weight of the acrylic resin and the alkoxyaminotriazine.

11. The powdery coating composition according to claim 10 in which said acid amide is at least one of amides of aromatic carboxylic acid, aromatic sulfonic acid, alicyclic sulfonic acid and alicyclic carboxylic acid.

12. The powdery coating composition according to claim 1 in which the proportions of a solid cross-linking agent and a base resin are 20 to 40% by weight of the former and 80 to 60% by weight of the latter.

* * * * *